United States Patent [19]

Iwagaya et al.

[11] Patent Number: 4,949,025

[45] Date of Patent: Aug. 14, 1990

[54] NUMERICAL CONTROL METHOD FOR VARIABLY SETTING POSITIONING ACCURACY

[75] Inventors: Takashi Iwagaya, Hachioji; Tomomi Nakazato, Kawasaki, both of Japan

[73] Assignee: Fanuc Ltd., Minamitsuru, Japan

[21] Appl. No.: 245,395

[22] PCT Filed: Feb. 19, 1988

[86] PCT No.: PCT/JP88/00179

§ 371 Date: Aug. 11, 1988

§ 102(e) Date: Aug. 11, 1988

[87] PCT Pub. No.: WO88/06752

PCT Pub. Date: Sep. 7, 1988

[30] Foreign Application Priority Data

Feb. 24, 1987 [JP] Japan .................................. 62-39195

[51] Int. Cl.[5] ................................................ H02P 5/00

[52] U.S. Cl. .................................... 318/569; 318/567; 318/568.1; 364/513

[58] Field of Search ................................ 318/562–573, 318/632, 600, 601, 602, 603; 364/513, 474.12, 474.23, 474.31

[56] References Cited

U.S. PATENT DOCUMENTS 4,475,160 10/1984 Inaba .................................. 364/513

4,785,221 11/1988 Neko .............................. 318/567 X

*Primary Examiner*—William M. Shoop, Jr.

*Assistant Examiner*—Paul Ip

*Attorney, Agent, or Firm*—Staas & Halsey

[57] ABSTRACT

A numerical control method makes it possible to perform machining of a workpiece at a high speed with a desired accuracy. After start of pulse distribution, a determination is made as to whether or not both a block being executed and a next block of an NC program relate to a cutting command (steps S12 and S13). An in-position value (A, B), corresponding to the determination result, is then stored in a register (C). In the case of three control axes, when the deviations (εx, εy, εz) between target moving amounts and actual moving amounts for the three control axes are less than the value stored in the register (C), positioning control for the present block is completed, and the execution for the next block is started (S10). This permits variable setting of the desired positioning accuracy to be carried out. The method is applicable for any number of control axes.

5 Claims, 2 Drawing Sheets

1
CPU
10
11
ROM
12
RAM
NON-VOLATILE MEMORY
13
15
SERVO INTERFACE
14
CRT/MDI
16
18X
17X
εx
ERROR REGISTER
MX
PX
εy
ERROR REGISTER
17Y
18Y
MY
PY
εz
ERROR REGISTER
17Z
18Z
MZ
PZ

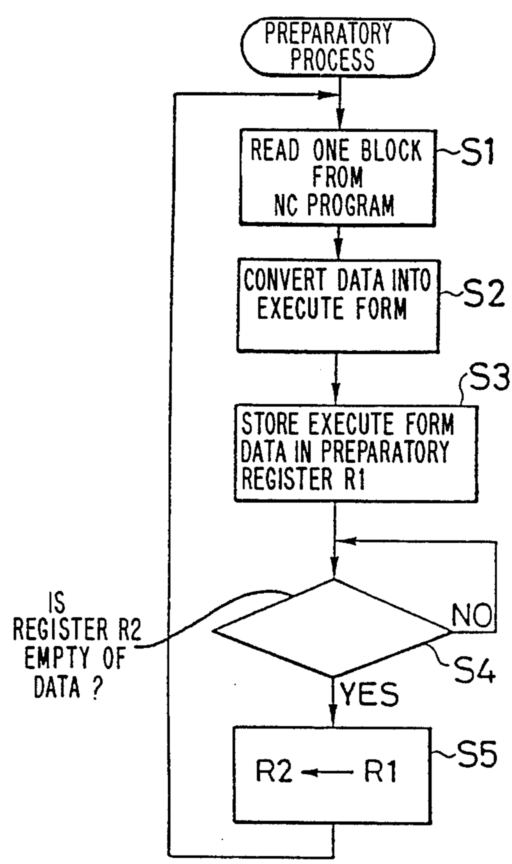
FIG.2
PREPARATORY PROCESS
READ ONE BLOCK FROM NC PROGRAM
S1
CONVERT DATA INTO EXECUTE FORM
S2
STORE EXECUTE FORM DATA IN PREPARATORY REGISTER R1
S3
IS REGISTER R2 EMPTY OF DATA ?
NO
S4
YES
R2 ← R1
S5

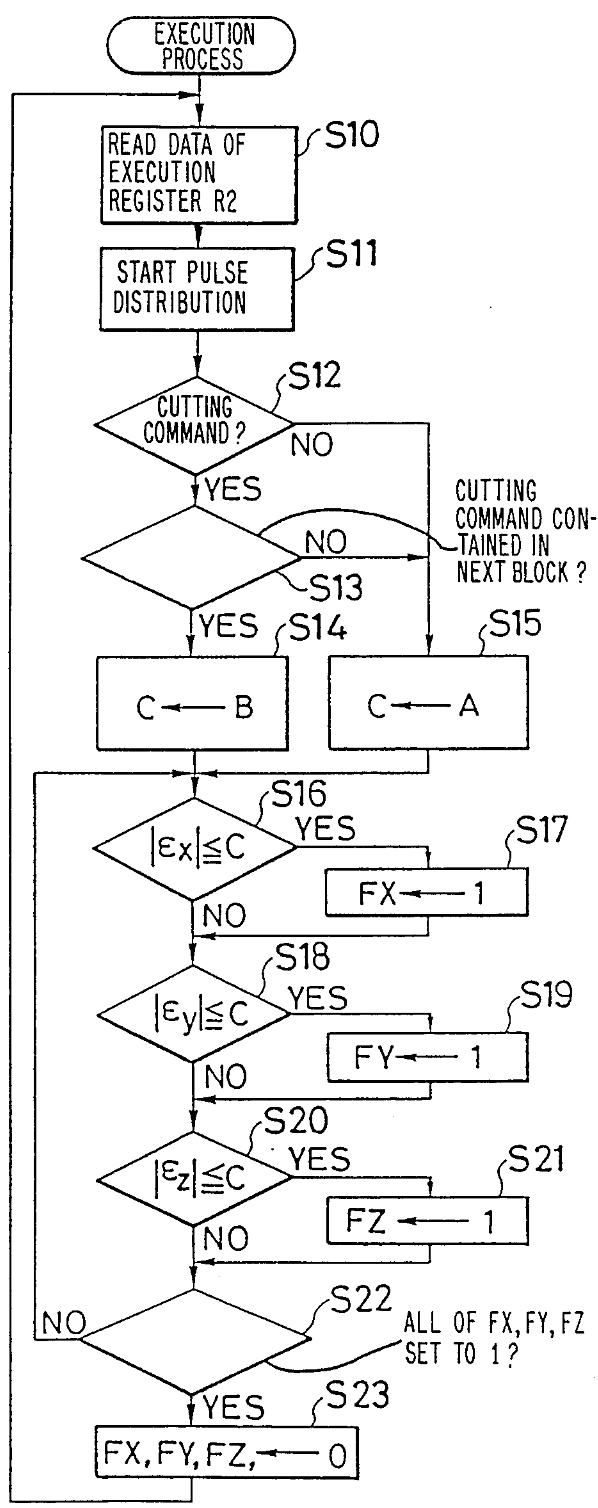
FIG.3
EXECUTION PROCESS
READ DATA OF EXECUTION REGISTER R2
S10
START PULSE DISTRIBUTION
S11
CUTTING COMMAND ?
S12
NO
YES
CUTTING COMMAND CONTAINED IN NEXT BLOCK ?
NO
S13
YES
S14
S15
C ← B
C ← A
|εx|≦C
S16
YES
S17
FX ← 1
NO
|εy|≦C
S18
YES
S19
FY ← 1
NO
|εz|≦C
S20
YES
S21
FZ ← 1
NO
S22
ALL OF FX, FY, FZ SET TO 1 ?
NO
YES
S23
FX, FY, FZ, ← 0

NUMERICAL CONTROL METHOD FOR VARIABLY SETTING POSITIONING ACCURACY

BACKGROUND OF THE INVENTION

1. Field of the Invention

The present invention relates to a numerical control method capable of performing various controls at high speeds, with a desired positioning accuracy.

2. Description of the Related Art

In positioning control effected by a numerical control apparatus, a control object is controlled so that a deviation between a target position and an actual position falls within a predetermined range. In machining a workpiece, for instance, the numerical control apparatus reads, block by block, an NC program in which machining conditions such as a tool locus are stated, and executes respective blocks of the program in sequence. In the case of the thus read block containing a moving command, the numerical control apparatus determines completion of positioning control for a block when the absolute of a stored value of an error register, housed in a servo circuit which forms part of a tool driving system, reaches a value below a preset in-position value during the execution of the same block. The numerical control apparatus then starts the execution of the next block, the stored value representing a deviation or error between a target moving amount of a tool, specified by the moving command, and an actual moving amount of the tool detected by a position detector.

In a positioning control of this kind, the positioning accuracy is improved but a period of time required for positioning is lengthened as the in-position value is set to a smaller one.

According to the conventional method, the in-position value is fixedly set, and hence it is difficult to simultaneously obtain an improved positioning accuracy and a shortened execution time period for desired positioning.

SUMMARY OF THE INVENTION

The object of the present invention is to provide a numerical control method which is capable of executing various controls at high speeds, with a desired positioning accuracy maintained, by variably setting the positioning accuracy.

In order to achieve the above-mentioned object, a numerical control method according to the present invention comprises the steps of (a) presetting values of a parameter, each of the parameter values representing positioning accuracy for an associated one combination of kinds of moving commands, and (b) reading and executing a numerical control program block by block. The step (b) includes the steps of (b1) determining a combination of kinds of moving commands which are respectively stated in a plurality of blocks including a block to be executed at present time, (b2) selecting a corresponding one of the parameter values set by the step (a) in accordance with the result of the determination of the step (b1), and starting execution of the present block, and (b3) starting execution of the next block when it is determined, on the basis of the parameter value selected in the step (b2), that positioning associated with the moving command for the present block is completed.

As mentioned above, according to the present invention, since the positioning accuracy is variably set during the execution of control in accordance with a combination of moving commands which are sequentially read from an NC program, it is possible to carry out various controls at high speeds with desired accuracy.

BRIEF DESCRIPTION OF THE DRAWINGS

FIG. 2 is a flowchart of a preparatory process for execution of positioning control effected by the apparatus of FIG. 1; and FIG. 3 is a flowchart showing a process for execution of the positioning control.

DESCRIPTION OF THE PREFERRED EMBODIMENT

Figure 1:
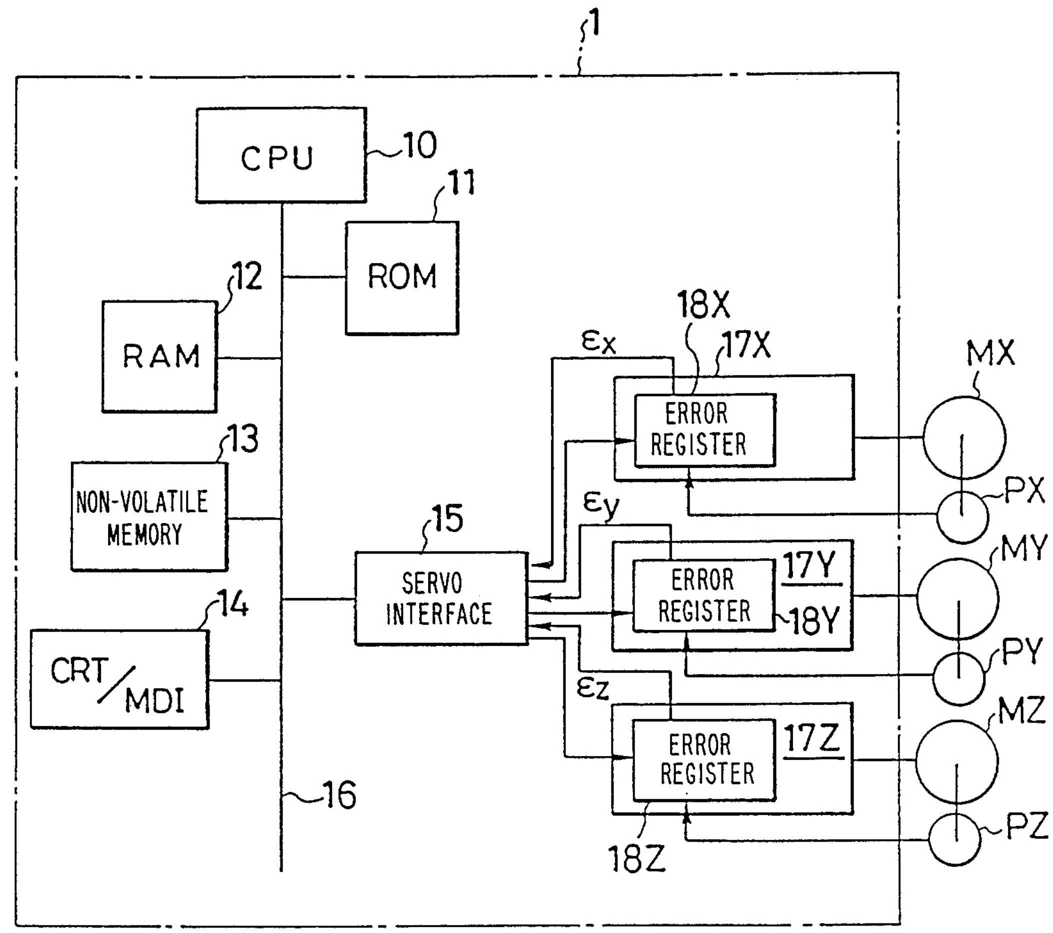
FIG. 1 is a block diagram showing a numerical control apparatus and peripheral elements for embodying a numerical control method according to an embodiment of the present invention.

In FIG. 1, a numerical control apparatus (hereinafter referred to as NC apparatus) 1 is connected through buses 16 to a central processing unit (hereinafter referred to as CPU) 10, a ROM 11 storing a management program for generally controlling the NC apparatus 1, for instance, a RAM 12 for temporal storage of data, a non-volatile memory 13 for storing an NC program for machining and parameters such as in-position values, mentioned later, a data input device (hereinafter referred to as CRT/MDI) 14 with a CRT display device, and a servo interface 15. Connected to the interface 15 are servo circuits 17X, 17Y and 17Z for driving servomotors MX, MY and MZ associated with three control axes (X, Y and Z axes) of an NC machine tool.

Housed in the servo circuits 17X, 17Y and 17Z are error registers 18X, 18Y and 18Z which are so arranged as to receive pulses distributed from the CPU 10 through the servo interface 15 and feedback pulses from position detectors PX, PY and PZ respectively mounted on the servomotors MX, MY and MZ, and to store deviations or errors $\epsilon x$, $\epsilon y$ and $\epsilon z$ between commanded moving amounts and actual moving amounts, respectively. The CPU 10 is arranged to detect these deviations or error amounts through the servo interface 15, and execute positioning control so that each error amount becomes zero, to thereby drive the machine tool in such a manner that a workpiece (not shown) is formed into a desired shape, for instance.

Next, the operation of the numerical control apparatus 1 will be explained.

At first, the NC program is stored in the non-volatile memory 13, and various in-position values as parameters indicative of positioning accuracy are inputted through the CRT/MDI 14 and stored in associated address regions of the non-volatile memory 13.

An explanation as to the setting of the in-position values will be given. According to the present invention, the in-position values are substantially variably setable. The reason to do so resides in that a desired positioning accuracy of the end point in a certain block, i.e., of the start point in the next block, varies case by case when the NC program is executed block by block. More specifically, according to the present invention, the in-position value is set to a small value if the positioning should be carried out precisely, otherwise the in-position value is set to a large value so as to effect positioning process at a high speed. Further, the desired positioning accuracy is determined in dependence on a combination of kinds of plural moving commands to be executed continually.

In this embodiment, the in-position value is set differently between when (i) both of two moving commands to be executed continually are rapid feed commands, or, either one of these commands is a rapid feed command and the other command is cutting command, and when (ii) both of the two commands are cutting commands. More specifically, the in-position value is set to a value of A for the case (i), and to a value of B, less than the value A, for the case (ii).

When the NC apparatus 1 is operated after various in-position values are set, the CPU 10 performs a time-sharing control. That is, in appearance, the CPU 10 concurrently executes a preparatory process, an execution process and other processes. In the preparatory process, the CPU 10 reads command data of one block concerned from the NC program, and converts the same data into data of execute form. In the execution process, it performs pulse distribution to each axis.

With reference to FIGS. 2 and 3, an explanation will be given as to the preparatory and execution processes which relate to the present invention.

In the preparatory process, as shown in FIG. 2, command data stated in one block concerned is read out from the NC program (the step S1), and then the data is converted into data of execute form (the step S2) which is then stored in a preparatory register R1 (the step S3). Next, a determination is made as to whether or not data previously stored in an execution register R2 has been read out for execution by the CPU 10 and thus the register R2 is empty of data (the step S4). If it is determined that the register R2 is empty of data, the execute form data stored in the preparatory register R1 is transferred to and stored in the execution register R2 (the step S5). That is, the execution register R2 stores therein the execution data associated with the block to be executed at present time, whereas the preparatory register R1 stores therein the execute form data associated with the next block. The CPU 10 performs the processing of the steps S1 through S5 within a period of time for which each cycle of the time-sharing control is allocated.

On the other hand, in the execution process (FIG. 3), the CPU 10 reads the execute form data stored in the execution register R2 (the step S10), and starts the pulse distribution processing (the step S11), so as to distribute pulses to the error registers 18X, 18Y and 18Z through the servo interface 15. As a consequence, the servomotors MX, MY and MZ are driven, and the respective register values are decreased each time the error registers 18X, 18Y and 18Z are respectively supplied with a feedback pulse, generated by the position detectors PX, PY and PZ. The servomotors MX, MY and MZ are driven so that error amounts $\epsilon x$, $\epsilon y$ and $\epsilon z$ accumulated in the error registers 18X, 18Y and 18Z become zero.

Simultaneously with execution of the pulse distribution process in time-sharing manner, the CPU 10 determines whether or not a cutting command is contained in the block which is being executed (the step S12). If the cutting command is stated, the CPU 10 determines whether or not a cutting command is also contained in the next block, which has been already read out (the step S13). If it is determined that the next block also contains the cutting command, the CPU 10 reads out the in-position value of B, which has been stored beforehand in that address region of the non-volatile memory 13 and which corresponds to the results of these determinations, and stores the same in a register C (the step S14). On the other hand, if it is determined at the step S12 that no cutting command is contained in the block which is being executed, and if it is determined at the step S13 that a command of the next block is not a cutting command, that is, if no cutting command is contained in any one of the two blocks, the in-position value of A is stored in the register C, which value has been stored beforehand in that address region of the non-volatile memory 13 and which corresponds to the results of these determinations (the step S15). Then, the CPU 10 reads the error values $\epsilon x$, $\epsilon y$ and $\epsilon z$ from the error registers 18X, 18Y and 18Z, and determines whether or not the absolute value of each of the error values is smaller than an associated one of the in-position values A and B stored in the register C (the steps S16, S18 and S20). If it is determined that the absolute of any one of the error values $\epsilon x$, $\epsilon y$ and $\epsilon z$ is less than the in-position value, the CPU 10 sets an associated one or ones of flags FX, FY and FZ to value of "1" (the steps S17, S19 and S21). When all of the flags FX, FY and FZ are set to "1" (the step S22), the CPU 10 determines that the target position or the end point for the block being currently executed is reached. Then, all of the flags FX, FY and FZ are set to "0" (the step S23), and the program returns to the step S10 to start processing for the next block.

The present invention is not limited to the foregoing embodiment, and may be modified in various ways. For instance, in the aforementioned embodiment, fulfillment of each of two in-position value selecting conditions is checked, i.e., whether a shift from cutting feed to cutting feed or other types of shift will be made is checked, and either one of two in-position values is selected in dependence on the condition fulfilled. However, instead of this, it may be possible to employ the in-position value of the type having a different value in dependence on a combination of kinds of moving commands for the present and next blocks. In this case, the in-position values for respective combinations are set beforehand, and a determination of type of combination of commands is made, instead of the determinations of the steps S12 and S13 of FIG. 3 being performed, and further, the in-position value in accordance with the result of the aforementioned determination is set in the register C.

Moreover, although the present invention is applied to three-axis control in the aforementioned embodiment, the present invention can be modified in accordance with an increase and decrease in number of control axes.

We claim:

1. A numerical control method for variably setting positioning accuracy, comprising the steps of:

(a) presetting values of a parameter, each of the parameter values representing positioning accuracy for an associated one combination of kinds of moving commands; and (b) reading and executing consecutive blocks of a numerical control program;

said step (b) including the substeps of:

(b1) determining a combination of kinds of moving commands which are respectively stated in a plurality of the blocks including a block to be executed at present time;

(b2) selecting a corresponding one of the parameter values set in said step (a) in accordance with the result of the determination of said substep (b1), and starting execution of the block to be executed at the present time; and (b3) starting execution of the next block of the numerical control program when it is determined, on the basis of the parameter value selected in said substep (b2), that positioning associated with the moving command for the block to be executed at the present time is completed.

2. A numerical control method for variably setting positioning accuracy according to claim 1, wherein each of said parameter values is set for a respective combination of two kinds of moving commands in said step (a), the combination of kinds of moving commands in the present and next blocks being determined in said substep (b1).

3. A numerical control method for variably setting positioning accuracy according to claim 1, wherein said parameter values are in-position values, and said substep (b3) further includes determining whether an absolute of a value, stored in an error register housed in a servo circuit of a numerical control apparatus, is less than the in-position value selected at said substep (b2), signifying the completion of the positioning.

4. A numerical control method for variably setting positioning accuracy according to claim 2, wherein the parameter values associated with a combination of cutting commands are set in said step (a) to values less than those associated with non-cutting combinations of commands.

5. A method for variably setting positioning accuracy of a tool controlled by a numerical control apparatus, comprising the steps of:

(a) reading first and second consecutive blocks in a numerical control program for controlling the tool;
(b) determining command types of the consecutive blocks;
(c) selecting a predetermined positioning accuracy parameter corresponding to the determined command types;
(d) controlling the tool to machine a workpiece to within the selected positioning accuracy parameter in accordance with the command contained in the first consecutive block; and
(e) repeating said steps (a) through (d) for each subsequent consecutive block.

* * * * *